Feb. 27, 1940.                R. C. RUSSELL                    2,191,833
                           AUTOMOTIVE DRIVE AXLE
                          Filed Dec. 1, 1937         2 Sheets-Sheet 1

INVENTOR
ROBERT C. RUSSELL
BY Kwis Hudson & Kent
ATTORNEYS

Feb. 27, 1940.   R. C. RUSSELL   2,191,833
AUTOMOTIVE DRIVE AXLE
Filed Dec. 1, 1937   2 Sheets-Sheet 2
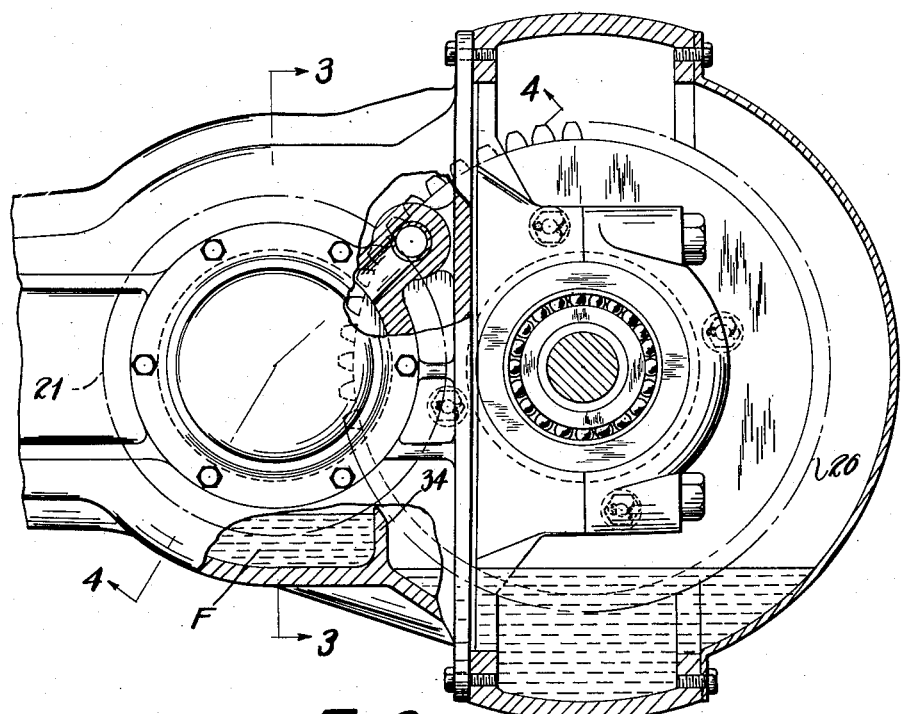
FIG. 2
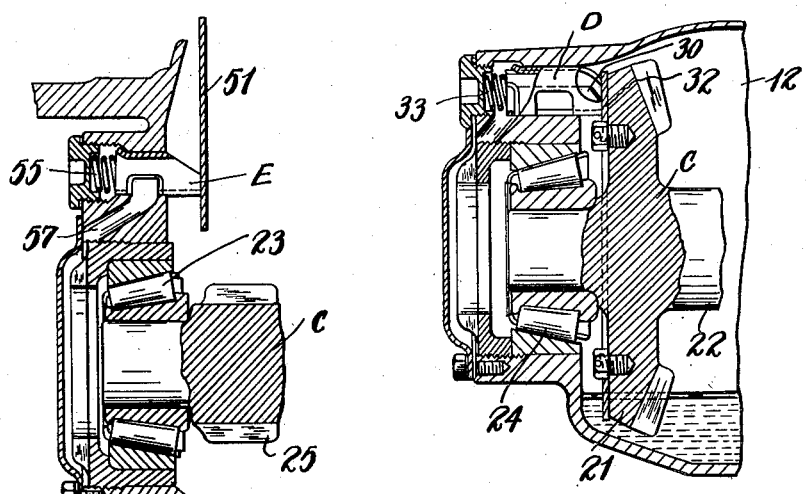
FIG. 4   FIG. 3
INVENTOR
BY ROBERT C. RUSSELL
ATTORNEYS Patented Feb. 27, 1940

2,191,833

UNITED STATES PATENT OFFICE 2,191,833

AUTOMOTIVE DRIVE AXLE

Robert C. Russell, Shaker Heights, Ohio, assignor to Eaton Manufacturing Company, Cleveland, Ohio, a corporation of Ohio Application December 1, 1937, Serial No. 177,555

3 Claims. (Cl. 184—11)

The present invention relates to automotive axles, and more particularly to "straight" type double reduction drive axles for automotive vehicles.

In "straight" type double reduction axles it is customary to rely upon the lubricant picked up by the bevel gear of the countershaft assembly as the lower part thereof rotates through the reservoir in the axle housing to lubricate the bevel pinion, bearings, etc. The bevel gear is invariably smaller in diameter than the ring gear attached to or forming a part of the differential assembly and the distance that the former dips into the lubricant in the axle housing under normal conditions is comparatively small, and in the event the level of the lubricant in the axle housing falls only slightly below the normal level the bevel gear is wholly above the lubricant and the axle is almost certain to fail for lack of lubrication. This same condition, that is, the condition in which the bevel gear is wholly above the lubricant in the axle housing, also exists when the vehicle in which the axle is embodied is traveling up an incline, even though the amount of lubricant in the reservoir may be normal, because under these conditions the lubricant in the forward part of the housing flows into the rear part of the housing due to the incline. Lack of lubrication with the resultant failure of the axle because of the last mentioned reason is very prevalent in mountainous country where vehicles are required to travel for long periods of time on a continuous up-grade.

An object of the present invention is the provision of a novel and improved straight type double reduction automotive drive axle in which the lower part of the bevel gear of the pinion and bevel gear countershaft assembly rotates through the body of lubricant even though lubricant in the main reservoir of the axle housing falls below normal, and/or irrespective of whether the vehicle in which the axle is embodied is traveling through flat or mountainous country.

Another object of the present invention is the provision of a novel and improved straight type double reduction automotive drive axle comprising means for lubricating the various parts thereof at all times and at all speeds within the range of operation of the vehicle, even though the lubricant in the main reservoir of the axle housing may fall below the normal level thereof, and/or irrespective of whether the vehicle is traveling through flat or mountainous country.

The present invention resides in certain novel details of construction, and combinations and arrangements of parts, and further objects and advantages thereof will be apparent to those skilled in the art to which it relates from the following description of the preferred embodiment thereof described with reference to the accompanying drawings, forming a part of this specification, in which similar reference characters designate corresponding parts throughout the several views, and in which:

Fig. 2 is a side elevation with portions broken away and in section of the axle shown in Fig. 1, looking from the left;

Fig. 3 is a section on the line 3—3 of Fig. 2, and

Fig. 4 is a section on the line 4—4 of Fig. 2.

Figure 1:
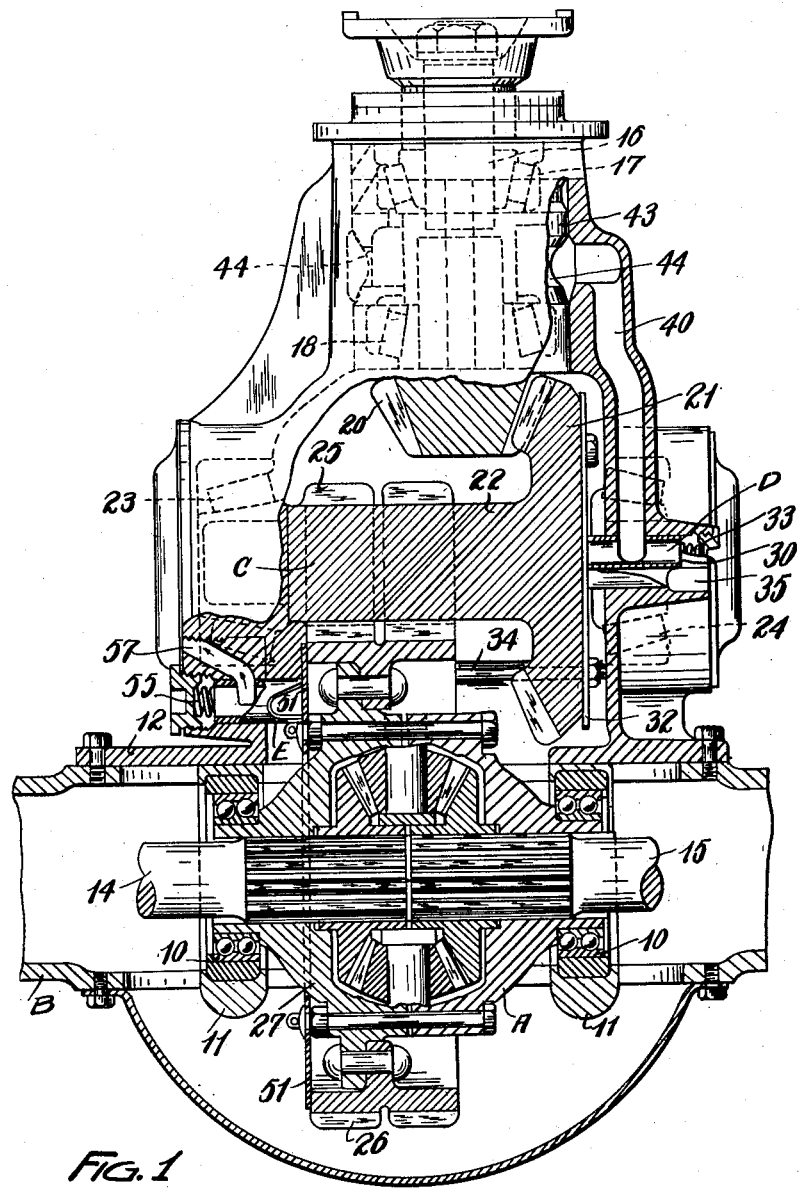
Fig. 1 is a plan view with portions broken away and in section of an automotive "straight" type double reduction rear axle embodying the present invention.

The present invention is particularly applicable to a straight type double reduction drive axle for an automotive truck and is herein illustrated and described as embodied in such an axle. The automotive axle herein shown and described is similar to the straight type double reduction rear axle for an automotive truck shown in an application of Gustav W. Carlson and myself, Serial No. 105,900 filed October 16, 1936, modified to embody the present invention and only those parts thereof which are necessary to a complete understanding of the present invention will be herein referred to and described.

In referring to the drawings, the reference character A designates a four pinion bevel gear type differential assembly rotatably supported on anti-friction bearings 10 in bosses 11 formed integral with the differential carrier housing 12 bolted to the axle housing B. The differential assembly is connected to the drive axles 14 and 15 and is adapted to be driven from the shaft 16 rotatably supported by anti-friction bearings 17 and 18 in the forward part of the differential carrier housing 12 by a double reduction gear train the first reduction of which comprises spiral bevel gears 20 and 21. The bevel pinion 20 is formed integral with the shaft 16 and the bevel gear 21 is formed integral with a countershaft 22 rotatably supported by anti-friction bearings 23 and 24 in the housing 12. The second reduction is through herringbone gears comprising a pinion 25 formed integral with the countershaft 22 and a ring gear 26 continuously in mesh with the pinion 25 fixed to the left-hand differential casing 27 in a convenient manner. The bevel gear 21, the herringbone pinion 25, and the countershaft 22 are hereinafter referred to as the countershaft assembly and designated in general by the reference character C. The drive shaft 16 is adapted to be connected with and driven from the main propeller or drive shaft of the vehicle in a conventional manner.

The construction thus far described is that of a conventional drive axle of the type referred to in which centrifugal force was relied upon to throw lubricant from the differential assembly A and the gears 20, 21, 25, and 26 into the bearings 17, 18, 23, and 24, for the purpose of lubricating the same. At slow speeds the centrifugal force referred to was insufficient to provide adequate lubrication for the bearings, with the result that they became unduly hot and in many instances failed. According to the provisions of the invention disclosed and claimed in the aforesaid application Serial No. 105,900, the bearings referred to are supplied with an adequate amount of lubrication at all speeds within the range of operation of the vehicle by collectors or scrapers which collect or scrape lubricant from rotating parts or members of the axle that enter into and rotate through the lubricant in the reservoir at the bottom of the axle housing and passages or ports, etc. which conduct the lubricant from the collectors or scrapers to the bearings.

The gears 20 and 21 and certain of the bearings, such as the bearings 17 and 18 for the pinion 20 and the bearing 24 for the countershaft assembly, were dependent for lubrication upon the bevel gear 21 or the equivalent thereof dipping into the lubricant in the axle housing, not only in the prior art axles but also in the axle disclosed in the aforesaid application. The bevel gear 21 or any member attached thereto is of relatively small diameter compared with the ring gear and ordinarily extends into the lubricant in the axle reservoir only a small amount, with the result that, if the level of the lubricant in the reservoir falls even a relatively small amount, the bevel gear 21 is wholly above the lubricant in the reservoir and the axle fails for lack of lubrication. A similar condition exists when the vehicle to which the axle is applied is traveling up a grade and the lubricant in the reservoir flows into the back of the axle housing. According to the provisions of the present invention the deficiency in the prior art lubricating systems or axles is overcome by providing an auxiliary lubricant reservoir in the forward part of the axle housing, the level of the lubricant in which reservoir is independent of the level of the lubricant in the main reservoir and into which auxiliary reservoir the bevel gear 21 extends.

As shown, lubricant is supplied to the right-hand bearing 24 for the countershaft assembly C and the bearings 17 and 18 for the shaft 16 by a collector or scraper D of substantially tubular shape provided with a partition or flange 30 projecting from the lower part thereof slidably supported in a cylindrical aperture in the housing 12. The collector D is continuously pressed into contact with the right-hand side of a vertical disk 32 bolted or otherwise secured to the right side of the bevel gear 21 by a spring 33 interposed between the collector D and a plug threaded into the outer tapped end of the aperture within which the collector is positioned. The disk 32 rotates through the lubricant in the auxiliary reservoir F in the axle housing B, the normal level of which is indicated generally by the dot-dash lines on Figs. 2 and 3. As the disk rotates, lubricant is collected or scraped therefrom by the collector D and conducted to the bearing 24 by a passage or port 35 formed in the housing 12, the upper end of which passage aligns with an opening in the rear half of the scraper D while the lower end thereof opens into the chamber or recess within which the bearing 24 is located or retained.

The lubricant which collects in the forward part of the collector or in front of the partition is conducted to the bearings 17 and 18 by a passage or port 40 also formed in the housing 12. The upper end of the passage 40 aligns with an aperture in the collector D and the lower forward end thereof communicates with or opens into an annular channel or groove exteriorly of a member 43 within which the bearings 17 and 18 are supported, from which channel the lubricant flows into the interior of the member 43 and to the bearings 17 and 18 through suitable holes 44. From the interior of the member 43 the lubricant returns to the auxiliary reservoir F in the axle housing through the bearings 17 and 18. The forward end of the collector D is made to conform to the disk against which it engages, and the upper side thereof is cut away on an angle so that the lubricant on the disk can readily flow into the interior thereof, see Fig. 3.

Lubricant is supplied to the left-hand bearing 23 by a scraper E, similar to the scraper D less the partition, slidably supported in an aperture in the left-hand side of the housing 12. The scraper E engages a disk 51 secured to the differential assembly A in any convenient manner, as by being positioned under Belleville type spring washers fixed to the end of the bolts which secure the two halves of the differential case together. The scraper E is continuously urged into engagement with the disk 51 by a spring 55 interposed between the outer end thereof and a plug threaded into the outer tapped end of the aperture within which the scraper is positioned. The lubricant collected therein is conducted to the bearing 23 by a channel or passage 57 in the housing, the upper end of which passage aligns with an aperture in the collector while the lower end communicates with or opens into the aperture or chamber within which the bearing 23 is supported. The right-hand end of the collector E conforms to the side of the disk 51 against which it engages and the upper side thereof is cut away at an angle to allow the lubricant to readily enter the interior thereof. From the foregoing it will be seen that lubricant will be collected from the disks 32 and 51 by the collectors D and E respectively, and supplied to the respective bearings at all speeds within the range of operation of the vehicle.

The springs interposed behind the scrapers D and E provide a substantially constant pressure between the same and the disks against which they engage and allow the scrapers to readily follow the disks which may not necessarily run exactly true. This construction also reduces the noise to a minimum. If desired, the partition in the scraper D may be omitted or may be moved to one side or the other, thus diverting a larger or smaller proportion of the lubricant scraped from the disk to one or the other of the bearings. In connection with either collector, it will be apparent that one or more partitions may be employed, thus dividing the scraper into a corresponding number of compartments, all of which may be connected to various parts of the axle. In the present instance additional members have been provided in the form of disks which the collectors engage, but it is to be understood that the collectors or scrapers may be made to engage directly against some rotating member of the assembly, such as the back of the bevel gear 21 or the left-hand side of the ring gear 26, if desired.

As shown, the partition 34 extends entirely across the housing 12, and the height thereof is limited by the bevel gear 21 of the countershaft assembly and the ring gear 26 of the ring gear and differential assembly, but it will be understood that the partition or web 34 may be arranged so as to surround the bevel gear 21 of the countershaft only, in which event the height thereof can be increased. The disadvantage of the latter construction lies in the difficulty with which lubricant can be supplied thereto at low speeds, but this can be largely overcome by properly arranging the partition and under certain operating conditions may be preferred. In the embodiment of the invention shown, lubricant is supplied to the auxiliary reservoir F from the main reservoir through the medium of the disk 51 and the scraper E by way of the passage 57 and the bearing 23. A certain amount of the lubricant transferred to the pinion 25 from the gear 26 will also run into the auxiliary reservoir.

While the invention is shown and described as embodied in an axle similar to that disclosed and claimed in the aforesaid application Serial No. 105,900, it is to be understood that it is applicable to any "straight" type double reduction axle.

From the foregoing description of the preferred embodiment of the invention, it will be apparent that the objects of the invention heretofore enumerated have been accomplished and that a novel and improved means has been provided for supplying lubricant to a rotating member or part of an automotive drive axle located above the normal level of the lubricant in the main reservoir thereof at all times and at all speeds within the range of operation of the vehicle irrespective of whether the vehicle is traveling through flat or mountainous country, or whether or not the lubricant in the main reservoir of the axle is at the proper level. While the preferred embodiment of the invention has been described in considerable detail, it is not the intention to be limited to the particular construction shown which is merely illustrative of the invention. It is my intention to hereby cover all adaptations, modifications, and uses that come within the practice of those skilled in the art to which the invention relates, and I particularly point out and claim as my invention the following:

1. In a double reduction straight type automotive drive axle, the combination of an axle housing, a differential carrier housing detachably fixed to said axle housing and forming with said axle housing a lubricant reservoir, a ring gear and differential assembly having an annular surface thereon rotatably supported in said differential carrier housing with the lower portion of said annular surface extending below the normal level of the lubricant in said reservoir, a pinion and bevel gear countershaft assembly rotatably supported in said differential carrier housing at one side of said ring gear and differential assembly with the pinion thereof in mesh with said ring gear, said bevel gear being smaller than said ring gear and offset axially from said ring gear but overlapping the latter, a vertical web in the lower portion of said differential carrier housing offset from said ring gear and differential assembly on the countershaft assembly side and adapted to form an auxiliary lubricant reservoir underneath the bevel gear of said countershaft assembly, a lubricant scraper carried by said differential carrier housing and yieldably urged into engagement with said annular surface of said ring gear and differential assembly, and means for conducting lubricant from said scraper to said auxiliary reservoir.

2. In a double reduction straight type automotive drive axle, the combination of an axle housing, a differential carrier housing detachably fixed to said axle housing and forming with said axle housing a lubricant reservoir, a ring gear and differential assembly having an annular surface thereon rotatably supported in said differential carrier housing with the lower portion of said annular surface extending below the normal level of the lubricant in said reservoir, a pinion and bevel gear countershaft assembly rotatably supported in said differential carrier housing at one side of said ring gear and differential assembly with the pinion thereof in mesh with said ring gear, said bevel gear being smaller than said ring gear and offset axially from said ring gear but overlapping the latter, a vertical web in the lower portion of said differential carrier housing offset from said ring gear and differential assembly on the countershaft assembly side and adapted to form an auxiliary lubricant reservoir underneath the bevel gear of said countershaft assembly, said differential carrier housing having an aperture therein, a lubricant scraper slidably supported in said aperture, means for yieldably urging said lubricant scraper into engagement with said annular surface of said ring gear and differential assembly, and means for conducting lubricant from said scraper to said auxiliary reservoir.

3. In a double reduction straight type automotive drive axle, the combination of an axle housing having a differential carrier housing detachably fixed to said axle housing and forming with said axle housing a lubricant reservoir, a ring gear and differential assembly having an annular surface thereon rotatably supported in said differential carrier housing with the lower portion of said annular surface extending below the normal level of the lubricant in said reservoir, a pinion and bevel gear countershaft assembly rotatably supported in said differential carrier housing at one side of said ring gear and differential assembly with the pinion thereof in mesh with said ring gear, said bevel gear being smaller than said ring gear and offset axially from said ring gear but overlapping the latter, a vertical web in the lower portion of said differential carrier housing offset from said ring gear and differential assembly on the countershaft assembly side and adapted to form an auxiliary lubricant reservoir underneath the bevel gear of said countershaft assembly, said differential carrier housing having an aperture therein, detachable means for closing the outer end of said aperture, a lubricant scraper slidably supported in said aperture, resilient means in said aperture behind said scraper for yieldably urging said scraper into engagement with said annular surface of said ring gear and differential assembly for scraping lubricant therefrom as said assembly rotates in operation, and means for conducting lubricant from said scraper to said auxiliary reservoir.

ROBERT C. RUSSELL.